United States Patent
Contrada et al.

(10) Patent No.: US 6,646,046 B2
(45) Date of Patent: Nov. 11, 2003

(54) AQUEOUS PRESSURE-SENSITIVE ADHESIVE COMPOSITION, PRODUCTION METHOD THEREFOR AND PRESSURE-SENSITIVE ADHESIVE TAPE USING THE COMPOSITION

(75) Inventors: Svetlana I. Contrada, North Brunswick, NJ (US); Koichi Nakamura, Princeton, NJ (US); David R. Hamblin, Jr., Raritan, NJ (US)

(73) Assignees: Permachel, New Brunswick, NJ (US); Nitto Denko Corporation, Osaka (JP)

( * ) Notice: Subject to any disclaimer, the term of this patent is extended or adjusted under 35 U.S.C. 154(b) by 130 days.

(21) Appl. No.: 10/003,342

(22) Filed: Dec. 6, 2001

(65) Prior Publication Data
US 2003/0108736 A1 Jun. 12, 2003

(51) Int. Cl.⁷ ................................. C08L 51/00
(52) U.S. Cl. ............................ 525/80; 525/50; 525/81; 525/85; 525/191; 525/192; 525/217; 525/218
(58) Field of Search ............................ 525/50, 80, 81, 525/85, 191, 192, 217, 218; 428/343, 355 RA

(56) References Cited

U.S. PATENT DOCUMENTS

| 4,033,918 A | 7/1977 | Hauber |
| 4,413,082 A | 11/1983 | Gleichenhagen et al. |
| 4,442,258 A | 4/1984 | Sunakawa et al. |
| 5,439,748 A | 8/1995 | Nakamura et al. |
| 6,136,903 A | 10/2000 | Su et al. |

FOREIGN PATENT DOCUMENTS

| EP | 0 099 087 A2 | 1/1984 |
| EP | 0 414 353 A2 | 2/1991 |
| EP | 0 710 708 A2 | 5/1996 |

OTHER PUBLICATIONS

European Search Report dated Feb. 14, 2003.

Primary Examiner—James J. Seidleck
Assistant Examiner—Travis B Ribar
(74) Attorney, Agent, or Firm—Sughrue Mion, PLLC

(57) ABSTRACT

A pressure-sensitive adhesive composition comprising a water-soluble polymer A, a water-insoluble component B, a water-incompatible solvent C that dissolves the water-insoluble component B and is incompatible with water, a water-soluble plasticizer D, and water, wherein the pressure-sensitive adhesive composition in a dry state has water solubility according to Technical Association of The Pulp and Paper Industry Useful Method 213 (TAPPI UM 213). Also disclosed are a method for producing a pressure-sensitive adhesive composition according to the present invention, comprising the steps of: preliminarily preparing a true nonaqueous solution of a water-insoluble component B in a water-incompatible solvent C, and mixing the true nonaqueous solution with an aqueous solution of at least one member selected from the group consisting of a water-soluble polymer A and a water-soluble plasticizer D, and a pressure-sensitive adhesive and a pressure-sensitive adhesive tape that use the composition.

10 Claims, No Drawings

AQUEOUS PRESSURE-SENSITIVE ADHESIVE COMPOSITION, PRODUCTION METHOD THEREFOR AND PRESSURE-SENSITIVE ADHESIVE TAPE USING THE COMPOSITION

BACKGROUND OF THE INVENTION

1. Field of the Invention

The present invention relates to a water-soluble pressure-sensitive adhesive composition and to a method for producing it. The present invention also relates to a pressure-sensitive adhesive tape with a water-soluble pressure-sensitive adhesive for use in papermaking processes or paper splicing in printing processes.

2. Description of Related Art

Paper manufacturers and print manufacturers use a pressure-sensitive adhesive tape containing a water-soluble pressure-sensitive adhesive when splicing two or more sheets of paper together in a processing step. The spliced portion is disintegrated to material pulp by means of a pulp disintegrator and reused. For this reason, the pressure-sensitive adhesive used in the splicing has to be dissolved in water and removed.

Usually, this completely water-soluble type pressure-sensitive adhesive comprises a highly polar polymer that contains significant amount of acrylic acid. However, such a pressure-sensitive adhesive by itself does not exhibit sufficient tack at ambient temperature and a large amount of a plasticizer is blended in order to decrease the modulus of elasticity so that sufficient tack can be developed. Blending a large amount of plasticizer causes various disadvantages. For example, although it has tack, it exhibits low shear resistance. After a pressure-sensitive adhesive tape is applied to a thin paper and stored for a certain period of time, the plasticizer component bleeds out from the adhesive into paper. Further, the plasticizer is subjected to a drastic change in water content and as a result, deformations such as so-called "telescoping" or "gapping" occur when the pressure-sensitive adhesive tape is stored in the form of a roll.

To avoid these problems, redispersible aqueous emulsion type acrylic pressure-sensitive adhesives have been proposed and are commercially available. The pressure-sensitive adhesive of this type is made hydrophilic by comprising high polar monomers and a surfactant. After the coating and drying, the emulsion particles bond to each other to form a film and they will not be redispersed in water unless a mechanical destructive force is applied to the pressure-sensitive adhesive. As a result, upon the disintegration of the spliced portion, the part where no mechanical destructive force has been applied remains as it is as an agglomeration or globule. In addition, the pressure-sensitive adhesive is not water-soluble in the strict sense, so that in the case where the pressure-sensitive adhesive is colored, the remaining pressure-sensitive adhesive, if any, makes paper recovered from the pulp unacceptable. The coloring of pressure-sensitive adhesive is often necessary in order to detect the spliced portion by means of a photomultiplier. Furthermore, the redispersible aqueous emulsion type acrylic type pressure-sensitive adhesives will hardly exhibit sufficient shear resistance at high temperatures encountered when they are used as a splice in a paper manufacturing process or in a printing process. This is because the polymers used therein have relatively small molecular weights and the crosslinking between the particles is difficult to achieve.

U.S. Pat. No. 6,136,903 (Su, et al.) teaches blending a water-insoluble (non-redispersible) emulsified polymer to a water-soluble (redispersible) emulsion polymer as defined according to Technical Association of The Pulp and Paper Industry Useful Method 213 (TAPPI UM 213, incorporated herein by reference) so as to increase the adhesive properties. However, the shear resistance of this pressure-sensitive adhesive when it is used as a splice in a paper manufacturing process or in a printing process is insufficient.

A further problem of pressure-sensitive adhesives of the completely water-soluble type is that the adhesive property imparted is in a limited range. No water-soluble tackifier that is compatible with water-soluble polymers has been found yet. The definition of tackifier used herein is it gives tackiness to the polymer although its Tg is higher than room temperature. When conventional emulsified tackifiers are added, they are dispersed in the polymer but they exhibit insufficient effect as a tackifier. In most cases, the addition of an emulsified tackifier alone results in a loss of stability and formation of granular structures and it becomes a mass. In the case of ordinary water-insoluble pressure-sensitive adhesives, addition of a tackifier or alteration of the composition of the polymer may provide the necessary properties of the pressure sensitive adhesive. For example, addition of a selected tackifier or alteration of polymer composition to lower the polarity of the polymer results in an increased adhesion to a nonpolar substrate such as polypropylene or polyethylene.

Thus, currently available water-soluble pressure-sensitive adhesives can hardly bond to polyethylene-coated paper or base paper that has a rough surface and contains a lot of paper powder. However, there is no room to further improve the pressure-sensitive adhesive and there has been available no appropriate product yet.

Furthermore, the conventional water-soluble pressure-sensitive adhesives must be blended with a plasticizer in a large amount when it is intended to obtain high adhesion and high tack and this causes the problems of oozing and change of properties due to humidity. The definition of plasticizer used herein is Tg is lower than room temperature and it is liquid state at room temperature. Attempts have been made to use polymers having as low a Tg as possible in order to maintain the blending amount of a plasticizer to a low level as in U.S. Pat. No. 5,439,748 to Nakamura et al. However, no sufficient effect was obtained. As disclosed in U.S. patent application Ser. No. 09/385,946 (Contrada), improvements in humidity stability and in adhesion have been tried by addition of 2-alkyl-2-oxazoline, or the like. This is also insufficient to achieve high adhesion to non polar substrate.

Naturally, further improvements of pressure-sensitive adhesive compositions and methods for producing them are keenly demanded.

SUMMARY OF THE INVENTION

Therefore, an object of the present invention is to solve the above problems and provide a water-soluble pressure-sensitive adhesive composition having balanced adhesive properties.

Another object of the present invention is to provide a method for producing such a water-soluble pressure-sensitive adhesive composition.

Still another object of the present invention is to provide a pressure-sensitive adhesive tape with such a water-soluble pressure-sensitive adhesive composition.

With a view to achieving the above-mentioned objects, the present inventors have made extensive studies. As a result they discovered that the above objects are attained by providing a water-soluble pressure-sensitive adhesive composition having blended therein a water-soluble polymer, a water-insoluble component, a water-incompatible solvent that dissolves the water-insoluble component, a water-soluble plasticizer, and an optional water-soluble component other than the water-soluble polymer and water-soluble plasticizer. Further, use of such a water-soluble pressure-sensitive adhesive gives rise to a pressure-sensitive tape with a water-soluble pressure-sensitive adhesive having balanced adhesive properties that could not be obtained by the conventional pressure-sensitive adhesive tapes.

Accordingly, the present invention provides the following:

(1) A pressure-sensitive adhesive composition comprising a water-soluble polymer A, a water-insoluble component B, a water-incompatible solvent C that dissolves the water-insoluble component B and is incompatible with water, a water-soluble plasticizer D, and water, wherein the pressure-sensitive adhesive composition in a dry state has water solubility according to Technical Association of The Pulp and Paper Industry Useful Method 213 (TAPPI UM 213). As used herein, the phrase "in a dry state" means that the composition has been dried so that water and solvent are essentially evaporated.

(2) A pressure-sensitive adhesive composition according to (1) above, further comprising a water-soluble component E other than the water-soluble polymer A and water-soluble plasticizer D.

(3) A pressure-sensitive adhesive composition according to (1) above, wherein the water-soluble polymer A forms a true solution when it is dissolved in water.

(4) A pressure-sensitive adhesive composition according to (3) above, wherein the water soluble polymer A comprises at least about 30% by weight of at least one monomer selected from acrylic acid, vinyl pyrrolidone, a compound of the formula M1 and a compound of the formula M2 below:

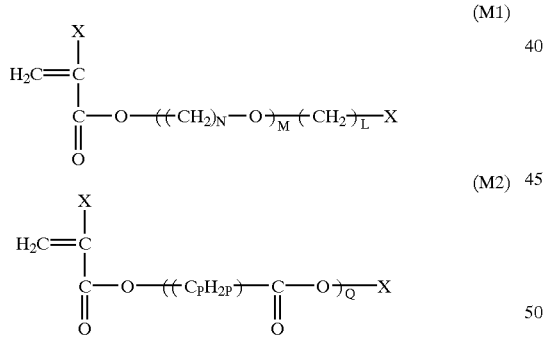

wherein X is hydrogen or an alkyl group, N is 1 to 4, M is 1 to 20, L is 0 to 5, P is 1 to 10, and Q is 1 to 10.

(5) A pressure-sensitive adhesive composition according to (1) above, wherein the water-insoluble component B has a tack at ambient temperature and is a polymer or an adhesive composition containing a polymer and optionally a tackifier and/or a plasticizer.

(6) A pressure-sensitive adhesive composition according to (5) above, wherein the water-insoluble component B comprises a polymer formed from 2-ethylhexyl acrylate and acrylamide.

(7) A pressure-sensitive adhesive composition according to (6) above, wherein the water-insoluble component B further comprises at least one compound selected from the group consisting of a tackifier and a plasticizer.

(8) A pressure-sensitive adhesive composition according to (1) above, wherein the water-soluble plasticizer D comprises at least one polymer selected from the group consisting of polyoxyethylene glycol, polypropylene glycol, and polyoxypropylene sorbitol ether.

(9) A pressure-sensitive adhesive composition according to (1) above, wherein the composition comprises 100 parts by weight of the water-soluble polymer A, from about 5 to about 100 parts by weight of the water-insoluble component B, from about 5 to about 500 parts by weight of the water-incompatible solvent C, from about 10 to about 300 parts of the water-soluble plasticizer D, and from about 100 to about 800 parts by weight of water.

(10) A method for producing a pressure-sensitive adhesive composition according to (1) above, comprising the steps of:

preliminarily preparing a true nonaqueous solution comprising a water-insoluble component B in a water-incompatible solvent C, and mixing the true nonaqueous solution with a true aqueous solution comprising at least one member selected from the group consisting of a water-soluble polymer A and a water-soluble plasticizer D.

(11) A pressure-sensitive adhesive comprising a pressure-sensitive adhesive composition formed according to claim 1, from which water and solvent have been essentially removed, said adhesive composition being in a dry state.

(12) A pressure-sensitive adhesive composition according to (11) above, which has a (water-insoluble dry part))/(total dry part) ratio by weight of about 0.5 or less in the dry state.

(13) A pressure-sensitive adhesive composition according to (12) above, wherein the (water-insoluble dry part))/(total dry part) ratio by weight is about 0.3 or less.

(14) A pressure-sensitive adhesive composition according to (12) above, wherein the (water-soluble part)/(water-insoluble part) ratio by weight is about 0.25 or less.

(15) A pressure-sensitive adhesive tape comprising a substrate having on at least a part of one or both surfaces thereof a pressure-sensitive adhesive according to any one of (11), (12), (13) or (14) above.

(16) A pressure-sensitive adhesive tape according to (15) above, wherein the pressure-sensitive adhesive tape is used in splicing paper in papermaking or printing process.

DETAILED DESCRIPTION OF THE INVENTION

Hereinafter, the present invention will be described in detail.

Water-soluble polymer A is not particularly limited and any conventional water-soluble polymer may be used in the present invention. For example, a polymer of 5 parts by weight of butyl acrylate (BA) and 95 parts by weight of acrylic acid (AA) partly neutralized with an alkali such as KOH, polymers obtained by polymerization in a water-soluble plasticizer as disclosed in U.S. Pat. No. 4,442,258 (the contents of which are incorporated herein by reference), polymers having a low Tg as disclosed in U.S. Pat. No. 5,439,748 (the contents of which are incorporated herein by reference) may be used. In this case, however, it must form a true solution when it is dissolved in water. For this purpose, the polymers must have sufficient polarity. Use of at least 30% by weight based on total monomer weight of monomer or monomers selected from the group consisting of acrylic acid, vinylpyrrolidone, monomer of the formula M1, and monomer of the formula M2 (each as described above) or combinations with one or other monomers can give the necessary polarity. Examples of the monomers that may be used in combination include methoxy ethyl acrylate, methoxy polyethyleneglycol methacrylate, and lauroxy polyethyleneglycol monoacrylate as M1, and caprolactone acrylate (Q=2 as average) as M2.

To the aqueous solution of polymer A, a water soluble plasticizer D is added to make a true aqueous solution. The water-soluble plasticizer D may be chosen from those conventionally used ones, preferably polyols, for example, polyethylene glycol, polypropylene glycol, polyoxypropylene sorbitol ether, polyglycerin, and polyoxyethylene glyceryl ether. Among these, polyethylene glycol and polypropylene glycol are preferred in view of tack and polyoxypropylene sorbitol ether is excellent in view of relatively low oozing. They may be used singly or two or more of them may be used in combination. Alternatively, they may be used in combination with water-soluble plasticizers other than polyethylene glycol, polypropylene glycol, and polyoxypropylene sorbitol ether.

On the other hand, the water-insoluble component B is dissolved in a solvent that is incompatible with water, such as toluene or ethyl acetate, to form a true nonaqueous solution. The nonaqueous solution is blended with the above-mentioned aqueous solution and well stirred. The solvent that is incompatible with water as used herein means a solvent that causes phase separation when it is mixed with water in a ratio of about 1:1.

The water-insoluble component B is a component that supplements the property that the conventional aqueous pressure-sensitive adhesive could not exhibit and includes the polymer itself, or a pressure-sensitive adhesive containing the polymer, and optionally a tackifier and/or a plasticizer, etc.

For example, in the case where paper having a rough surface and paper powder is attached thereon, the tack to be attained by blending a large amount of a plasticizer results in an insufficient inner cohesive force, which makes shearing force and resistance upon peeling insufficient. Accordingly, the conventional aqueous pressure-sensitive adhesives could not provide a sufficient splicing function. However, use of a polymer that is soluble in the solvent C alone or a polymer composition that contains a polymer, a tackifier and a plasticizer and has a sufficiently low modulus of elasticity (such as a copolymer composition that contains 2-ethylhexyl acrylate and acrylamide as the polymer B) can give rise to a sufficient tack and a sufficient cohesive force so that the property can be supplemented. In this case ethyl acetate may be used as the solvent C. Other examples of the water-insoluble component B include, without limitation, a copolymer of butyl acrylate and acrylic acid, and a copolymer of 2-ethylhexyl acrylate and acrylic acid.

In the case where bonding of the pressure-sensitive adhesive on a polyethylene-coated paper is needed, conventional pressure-sensitive adhesives can hardly bond on a polyethylene substrate, which is a nonpolar adherend, since they are very high in polarity. In this case, the adhesion to polyethylene can be supplemented by blending a polymer having a decreased polarity comprising 3 parts of acrylic acid and 97 parts of butyl acrylate, which are soluble in the solvent C, with polymerized rosin ester, Pensel D-125 (produced by Arakawa Chemical Industries Co., Ltd.), in an amount of 20 parts per 100 parts of the polymer. In this case, toluene may be used as the solvent C. Further, low oozing and high storage stability in high humidity can be expected since the amount of water soluble plasticizer can be reduced by adding water-insoluble component B.

One of the important factors in formulating of this kind of pressure-sensitive adhesives is to preliminarily prepare a true solution of a water-insoluble component B and a water-incompatible solvent C. The water-incompatible solvent C is an indispensable component. The term "water-incompatible solvent" means a solvent that causes phase separation when it is mixed with water in a ratio of 1:1 by weight.

Mixing a true aqueous solution obtained by dissolving a water-soluble plasticizer D in an aqueous solution of the water-soluble polymer A with a true solution of a water-insoluble component B in a water-incompatible solvent C with stirring results in emulsification. On this occasion, the polymer A or water-soluble plasticizer D serves as a surfactant. If the solvent C is absent, emulsification is difficult to achieve. If the water-insoluble component B is directly added to the aqueous solution of water-soluble polymer A without dissolving it in the solvent C, it is more difficult to make a dispersion due to its high viscosity. It may be possible to melt the water-insoluble component B at high temperatures before it can be mixed. However, this procedure is somewhat disadvantageous in that it incurs high costs when the operation is to be carried out on an industrial scale. It is not practical to use an aqueous emulsion pressure-sensitive adhesive or polymer for blending the water-insoluble component B. This is because they usually contain a surfactant, which is absorbed by the water-soluble polymer A or water-soluble plasticizer D so that as soon as the emulsion pressure-sensitive adhesive or polymer is blended with the water-soluble polymer A, the emulsion structure gives way to a non-uniform granular structure. In this case, if the emulsion pressure-sensitive adhesive or polymer contained the solvent C in the oil phase, it could be successfully blended with the aqueous solution of water-soluble polymer A. However, generally aqueous emulsion pressure-sensitive adhesives are used for constructing systems without using any solvent. Therefore, aqueous emulsion polymers or pressure-sensitive adhesives that contain solvents are not generally accepted.

To enable blending, it is only necessary that the water-insoluble component B be dissolved in the solvent C but the water-insoluble component B does not have to be converted into an aqueous emulsion before it can be blended into the aqueous solution of water-soluble polymer. The selection of the type of the solvent C is relatively important and which one is suitable depends on the combination of the water-soluble polymer and water-insoluble component B. Depending on the type of the solvent C, a decrease in adhesive force or tack feeling may occur. Although the reason for this phenomenon is not entirely clear at present, it is presumed that difference in the degree of mixing of components B and polymer A, cause such phenomenon.

A water-soluble or water-dispersible pigment or dye may be added as the other water-soluble component E for the detection by use of a photomultiplier upon splicing base paper as an adherend. To increase shear resistance and heat resistance of the pressure-sensitive adhesive, isocyanate- or epoxy-based crosslinking agent may be added as long as the water solubility is not lost.

In the pressure-sensitive adhesive composition of the present invention, ratios of the components in the composition are preferably from about 5 to about 100 parts by weight of the water-insoluble component B, from about 5 to about 500 parts by weight of the water-incompatible solvent C, from about 10 to about 300 parts of the water-soluble plasticizer D, and from about 100 to about 800 parts by weight of water per 100 parts by weight of the water-soluble polymer A.

The part by weight ratio (on dry basis) of the water-soluble components and the water-insoluble components has been determined to give rise to certain advantages when the following parameters are observed. This ratio, calculated herein as (water-insoluble dry part)/(total dry part)), is preferably about 0.5 or less, more preferably about 0.3 or less and even more preferably about 0.25 or less. If this ratio exceeds 0.5, the water solubility of the adhesive tends to be lost. The water-insoluble part mainly comprises the water-insoluble component B. However, in the case where the water-insoluble part contains a crosslinking agent, the crosslinking agent may react with the water-soluble polymer or the like to increase the water-insoluble part to some extent. The water-insoluble part may contain such a reaction product. Therefore, ratio may be measured with water or solvent extraction. To determine the amount of insoluble part, the adhesive was coated onto the release paper, dried for 5 minutes at room temperature and then for 5 minutes at 70° C., then cured at 150° C. for 30 seconds. Dry film thickness was about 75 micrometers. A sample of the dry adhesive with about 0.2 g weight was placed into the porous Teflon film, tied with a cotton thread and immersed in water for 7 days. The sample was removed from water, and dried at 130° C. to a constant weight. The ratio of insoluble part to total dry part was calculated as follows: $(C-A)/(B-A)$, where A is the weight of the cotton thread and Teflon film; B is the initial total sample weight, which includes adhesive, cotton thread and Teflon film; and C is the final total sample weight (including adhesive, cotton thread and Teflon film) after immersion in water and drying. Teflon film used was a bi-oriented polytetrafluoroethylene film having a pore size of about 0.2 micrometer, NTF-1122 grade produced by Nitto Denko Corporation.

By coating the pressure-sensitive adhesive on at least a part of one or both sides of a substrate or base material, such as a disintegrable paper or water-soluble film and drying, one or double sided water-soluble pressure-sensitive adhesive tape can be prepared.

EXAMPLES

The present invention will be described in more detail by examples and comparative examples. However, the present invention should not be construed as being limited to the examples. In the examples and comparative examples below, all parts and percents are by weight.

Example 1

40 Parts of caprolactone acrylate neutralized with 7.5 parts of KOH, 45 parts of methoxyethyl acrylate, and 3 parts of sodium styrenesulfonate were polymerized with ammonium persulfate (APS) as an initiator to form a water-soluble polymer A1. 100 Parts of the water-soluble polymer A1, 30 parts of polypropylene glycol (molecular weight: about 400) as a water-soluble plasticizer D1, 0.3 part of a water-soluble blue pigment (Unisperse Green G-E, produced by Ciba) as an other water-soluble component E1, and 304 parts of water were mixed with stirring to obtain an true aqueous solution.

100 Parts of a copolymer of 95 parts of butyl acrylate and 5 parts of acrylic acid, 30 parts of a terpene phenol resin (Sumilite Resin PR12603N, produced by Sumitomo Durez Co., Ltd.), and 5 parts of a xylene resin (Nikanol, produced by Mitsubishi Gas Chemical) were blended to obtain a water-insoluble component B1. 40 Parts of the water-insoluble component B1 per 100 parts by weight of the water-soluble polymer A1 were dissolved in 60 parts of toluene as a water incompatible solvent C1 to form a true nonaqueous solution.

The aqueous solution and the nonaqueous solution thus obtained were mixed with stirring for 0.5 hours (in the case of 300 lb batch scale) and then the resultant mixture was coated on one side of a 100 $\mu$m-thick disintegrable base paper to form a pressure-sensitive adhesive layer having a thickness of 80 $\mu$m (on dry basis). This was dried in an oven at 110° C. for 3 minutes to prepare a sample pressure-sensitive adhesive tape.

Example 2

60.27 Parts of acrylic acid neutralized with 4.7 parts of KOH, 3.17 parts of butyl acrylate, and 31.74 parts of polyoxypropylene sorbitol ether (Sannix SP-750 produced by Sanyo Kasei Co., Ltd.) were polymerized with ammonium persulfate (APS) as an initiator in water to form a water-soluble polymer A2. 100 Parts of the water-soluble polymer A2, 190 parts of a water-soluble plasticizer D2 (Sannix SP-750 produced by Sanyo Kasei Co., Ltd.), and 0.025 part of 1,3,5-triglycydyl isocyanurate (TEPIC-P, produced by Nissan Chemical Co., Ltd.), a crosslinking agent for water-soluble polymers as an other water-soluble component E2 were dissolved in 435 parts of water with stirring to form an true aqueous solution.

50 Parts of a 2-ethylhexyl acrylate/acrylamide copolymer (HRJ-4326, produced by Schenectady) as a water-insoluble component B2 per 100 parts of the water-soluble polymer A2 were dissolved in 75 parts of ethyl acetate as a water-incompatible solvent C2 to form a true nonaqueous solution.

The aqueous solution and nonaqueous solution thus obtained were mixed with stirring for 0.5 hours (in the case of 300 lb batch scale) to form a pressure-sensitive adhesive.

The pressure-sensitive adhesive was coated on one side of a 100 $\mu$m-thick disintegrable base paper to form a pressure-sensitive adhesive layer having a thickness of 80 $\mu$m (on dry basis). This was dried in an oven at 110° C. for 3 minutes to prepare a sample pressure-sensitive adhesive tape.

Example 3

100 Parts of polyoxypropylene sorbitol ether (SP-750 produced by Sanyo Kasei Co., Ltd.) as the water-soluble plasticizer D2 and 60 parts of polyoxyethylene glycol (molecular weight: about 200) as a water-soluble plasticizer D3, both per 100 parts of the water-soluble polymer A2, are dissolved in 450 parts of water to form an true aqueous solution.

On the other hand, a copolymer obtained by polymerizing 100 parts of butyl acrylate, 3 parts of acrylic acid and 5 parts of vinyl acetate, 20 parts of polymerized rosin ester (Pensel D-125, produced by Arakawa Chemical Industries, Co., Ltd.), which is known as a rosin ester improving the adhesion to a nonpolar adherend, and 5 parts of methyl ester of hydrogenated rosin (Hercolyn D, produced by Rika-Hercules Inc.) as a softening agent are blended to form a water-insoluble component B3. Then, 20 parts of the water-insoluble component B3 per 100 parts of the water-soluble polymer A2 is dissolved in 45 parts of toluene as the water-incompatible solvent C1 to form a true solution. These solutions are mixed with stirring for 0.5 hours (in the case of 300 lb batch scale). The resultant mixture are coated on one side of a 100 $\mu$m-thick disintegrable base paper to a pressure-sensitive adhesive layer having a thickness of 80 $\mu$m (on dry basis). This is dried in an oven at 110° C. for 3 minutes to prepare a sample pressure-sensitive adhesive tape.

Comparative Example 1

100 Parts of the water-soluble polymer A2, 190 parts of SP-750 mentioned above as a water-soluble plasticizer D2, and 0.025 part of 1,3,5-triglycydyl isocyanurate (TEPIC-P, produced by Nissan Chemical Co., Ltd.), i.e., a crosslinking agent for water-soluble polymer as the other water-soluble component E2, were dissolved in 435 parts of water with stirring for 0.5 hours (in the case of 300 lb batch scale) to form a water-soluble pressure-sensitive adhesive solution.

The adhesive solution thus obtained was coated on one side of a 100 $\mu$m-thick disintegrable base paper to form a pressure-sensitive adhesive layer having a thickness of 80 $\mu$m (on dry basis). This was dried in an oven at 110° C. for 3 minutes to prepare a sample pressure-sensitive adhesive tape.

Comparative Example 2

100 Parts of the water-soluble polymer A2, 190 parts of SP-750 mentioned above as a water-soluble plasticizer D2, and 0.025 part of 1,3,5-triglycydyl isocyanurate (TEPIC-P, produced by Nissan Chemical Co., Ltd.), a crosslinking agent for water-soluble polymer as the other water-soluble component E2 were dissolved in 435 parts of water with stirring to form an true aqueous solution.

300 Parts of a copolymer of 2-ethylhexyl acrylate and acrylamide (HRJ-4326, produced by Schenectady) as the water-insoluble component B per 100 parts of the water-soluble polymer A2 was dissolved in 450 parts of ethyl acetate as the water-incompatible solvent C2 to form a true nonaqueous solution.

The aqueous solution and nonaqueous solution were mixed with stirring for 0.5 hours (in the case of 300 lb batch scale) to form a pressure-sensitive adhesive.

The pressure-sensitive adhesive thus obtained was coated on was coated on one side of a 100 m-thick disintegrable base paper to form a pressure-sensitive adhesive layer having a thickness of 80 $\mu$m (on dry basis) and dried in an oven at 110° C. for 3 minutes to prepare a sample pressure-sensitive adhesive tape.

Evaluation

1. Water Solubility:

The water solubility of the pressure-sensitive adhesive was evaluated according to TAPPI UM213.

2. Peel Strength:

2a) Polyethylene-Coated Paper

A sample tape of 25 mm in width was pressed onto a polyethylene-coated paper by a reciprocation of 2 kg roller, and a 180'-peel adhesive strength was measured within 1 minute.

2b) Base Paper for Newspaper

A sample tape of 25 mm in width was pressed onto a sheet of base paper for newspaper by a reciprocation of 2 kg roller and a 180'-peel adhesive strength was measured within 1 minute.

|  | Example 1 | | Example 2 | | Comparative Example 3 | | Comparative Example 1 | | Comparative Example 2 | |
|---|---|---|---|---|---|---|---|---|---|---|
|  | Dry parts | | Dry parts | | Dry parts | | Dry parts | | Dry parts | |
| Water-soluble polymer A | A1 | 100 | A2 | 100 | A2 | 100 | A2 | 100 | A2 | 100 |
| Water-insoluble component B | B1 | 40 | B2 | 50 | B3 | 20 | — | — | B2 | 300 |
| Water-incompatible solvent C | C1 | 60 | C2 | 75 | C1 | 45 | — | — | C2 | 450 |
| Water-soluble plasticizer D | D1 | 30 | D2 | 190 | D2 D3 | 100 60 | D2 | 190 | D2 | 190 |
| Other water-soluble component E | E1 | 0.3 | E2 | 0.029 | E2 | 0.025 | E2 | 0.025 |  |  |
| Water |  | 304 |  | 435 |  | 450 |  | 435 |  | 435 |
| Water-insoluble part/Total dry part), theoretical [B/(A + B + D + E)] |  | 0.235 |  | 0.147 |  | 0.07 |  | 0 |  | 0.508 |
| Water-insoluble part/Total dry part), experimental [B/(A + B + D + E)] |  | 0.223 |  | 0.136 |  | 0.04 |  | 0 |  | 0.515 |

| | Results or Evaluation | | | | |
|---|---|---|---|---|---|
| TAPPI UM213 Water Solubility Test | OK | OK | OK Expected | OK | NG |
| Adhesive power to polyethylene-coated paper (g /23 mm) | 830 | 1000 | About 1,500 Expected | 360 | 2,000 or more (Base Material of Tape Destructed) |
| Adhesive power | 1700 | 1700 | About 1,700 | 710 | 1700 |

-continued

| | Results or Evaluation | | | | |
|---|---|---|---|---|---|
| TAPPI UM213 Water Solubility Test | OK | OK | OK Expected | OK | NG |
| to base paper for newspaper (g/25 mm) | Newspaper destructed | Newspaper destructed | (Destruction of Newspaper Expected) | | Newspaper destructed |

In the above table, "OK" means that the composition exhibited the desired water solubility, while "NG" means that it did not.

While the invention has been described in detail and with reference to specific examples thereof, it will be apparent to one of ordinary skill in the art that various changes and modifications can be made therein without departing from the spirit and scope thereof.

What is claimed is:

1. A pressure-sensitive adhesive composition comprising a water-soluble polymer A, a water-insoluble component B, a water-incompatible solvent C that dissolves the water-insoluble component B and is incompatible with water, a water-soluble plasticizer D, and water, wherein the pressure-sensitive adhesive composition in a dry state has water solubility according to Technical Association of The Pulp and Paper Industry Useful Method 213 (TAPPI UM 213).

2. A pressure-sensitive adhesive composition according to claim 1, further comprising a water-soluble component E other than the water-soluble polymer A and water-soluble plasticizer D.

3. A pressure-sensitive adhesive composition according to claim 1, wherein the water-soluble polymer A forms a completely true solution when it is dissolved in water.

4. A pressure-sensitive adhesive composition according to claim 3, wherein the water soluble polymer A comprises at least about 30% by weight of at least one monomer selected from acrylic acid, vinyl pyrrolidone, a compound of formula M1 and a compound of formula M2:

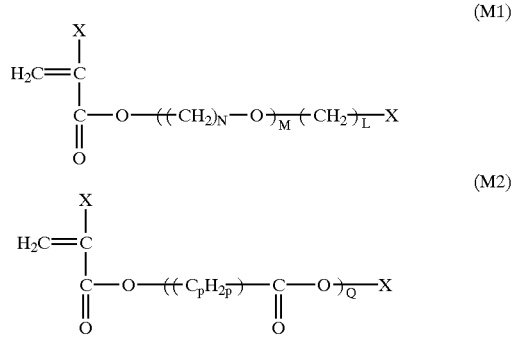

wherein X is hydrogen or an alkyl group, N is 1 to 4, M is 1 to 20, L is 0 to 5, P is 1 to 10, and Q is 1 to 10.

5. A pressure-sensitive adhesive composition according to claim 1, wherein the water-insoluble component B has a tack at ambient temperature and is a polymer, or an adhesive composition containing a polymer and at least one compound selected from the group consisting of a tackifier and a plasticizer.

6. A pressure-sensitive adhesive composition according to claim 5, wherein the water-insoluble component B comprises a polymer of 2-ethylhexyl acrylate and acrylamide.

7. A pressure-sensitive adhesive composition according to claim 6, wherein the water-insoluble component B further comprises at least one compound selected from the group consisting of a tackifier and a plasticizer.

8. A pressure-sensitive adhesive composition according to claim 1, wherein the water-soluble plasticizer D comprises at least one polymer selected from the group consisting of polyoxyethylene glycol, polypropylene glycol, and polyoxypropylene sorbitol ether.

9. A pressure-sensitive adhesive composition according to claim 1, wherein the composition comprises 100 parts by weight of the water-soluble polymer A, from about 5 to about 100 parts by weight of the water-insoluble component B, from about 5 to about 500 parts by weight of the water-incompatible solvent C, from about 10 to about 300 parts of the water-soluble plasticizer D, and from about 100 to about 800 parts by weight of water.

10. A method for producing a pressure-sensitive adhesive composition according to claim 1, comprising the steps of:

preliminarily preparing a true nonaqueous solution comprising a water-insoluble component B in a water-incompatible solvent C, and mixing the true nonaqueous solution with an aqueous solution comprising at least one member selected from the group consisting of a water-soluble polymer A and a water-soluble plasticizer D.

* * * * *

UNITED STATES PATENT AND TRADEMARK OFFICE
CERTIFICATE OF CORRECTION

PATENT NO. : 6,646,046 B2
DATED : November 11, 2003
INVENTOR(S) : Svetlana I. Contrada, Koichi Nakamura and David R. Hamblin, Jr.

It is certified that error appears in the above-identified patent and that said Letters Patent is hereby corrected as shown below:

<u>Title page,</u>
Item [73], Assignee, please correct "Permachel" to -- Permacel --.

Signed and Sealed this

Twenty-eighth Day of December, 2004

JON W. DUDAS
*Director of the United States Patent and Trademark Office*